April 6, 1971  L. H. GIRARD  3,574,019
METHOD OF MAKING A LAMINATED FASTENING DEVICE
Original Filed Oct. 7, 1966
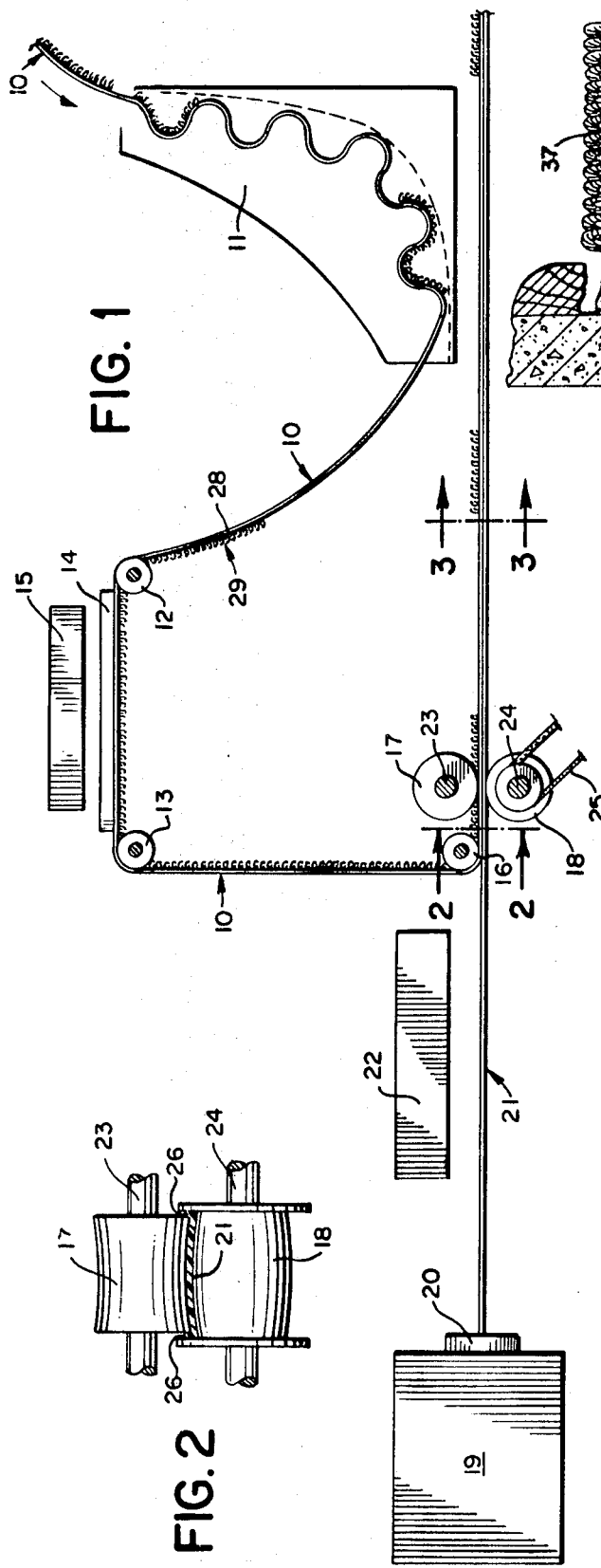
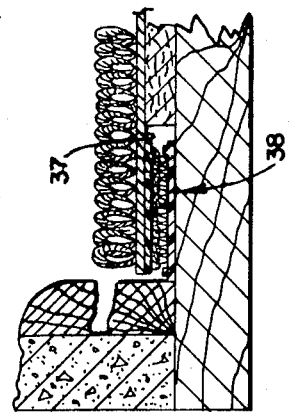
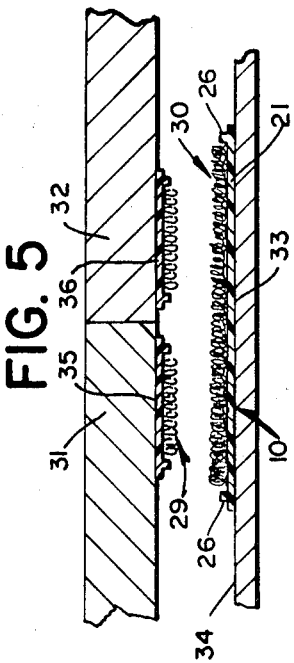
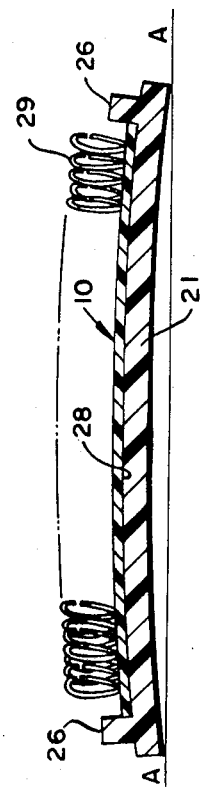
INVENTOR
LAURENT H. GIRARD
BY
ATTORNEYS

United States Patent Office 3,574,019
Patented Apr. 6, 1971

3,574,019
METHOD OF MAKING A LAMINATED FASTENING DEVICE
Laurent H. Girard, Bedford County, N.H., assignor to American Velcro, Inc.
Original application Oct. 7, 1966, Ser. No. 585,023, now Patent No. 3,391,434. Divided and this application Aug. 23, 1968, Ser. No. 749,891
Int. Cl. A41h 43/00
U.S. Cl. 156—66        6 Claims

ABSTRACT OF THE DISCLOSURE

A method of making a fastening device by extruding plastic as a substantially rectangular strip having a concave base and a convex surface cooling the extruded strip. A tape member is coated on its under surface with a thermoplastic; the opposite surface of the tape member has a plurality of hooking elements extending therefrom. The thermoplastic adhesive is then heated and the adhesive coated surface of the tape fastener is combined with the convex surface of the cooled vinyl strip and passed through complementary concave-convex pressure rolls tailored to the form of the extruded strip to achieve an adhesive bond along the entire curved surface.

CROSS REFERENCE TO RELATED APPLICATION

This is a divisional of co-pending application, Ser. No. 585,023, filed Oct. 7, 1966, now U.S. Pat. 3,391,434.

This invention relates to a fastening device having a semirigid member for use in the expeditious attachment of material objects to rigid surfaces. The invention particularly relates to a plastic strip having an arched cross section through its narrow dimension which produces a concave base and a convex surface and which incorporates a fastening device of the kind described in U.S. Pat. No. 3,009,235, and to a method of making such fastening device.

The fastening device described in the patent incorporates "hooking elements" which are formed of flexible resilient material into one of hooks or loops and characterized by the property that pressing a surface defined by the hooks into face-to-face relationship with a surface defined by the loops will result in a large number of hooks engaging a large number of loops which resist separation parallel to the interfacial plane of engagement but are readily separable by peeling forces applied substantially normal to this interfacial plane. Often these fastening devices comprise a sheet of woven fabric having raised threads of synthetic material such as nylon wherein the loops of one tape member are cut at their outer extremities to form hooks but the loops of the other tape member remain uncut so that the hooking elements of the fastening device are characterized in that one of said tape members is provided with hooks and the other with loops. The preservation of the shape of the hooks is obtained by a thermal treatment appropriate for the particular synthetic material used.

Hooking or fastening devices of this character are particularly useful when a flexible closure, as in closing devices for clothing and the like, is desired. Flexible fabric fasteners are not, however, useful for the expeditious installation of material objects on rigid surfaces because the adhesive bond required to satisfactorily affix a flexible fastener of the type described above to a rigid surface is ill suited to in situ operations. For example, the installation of wall paneling requires a support and fastening means which typically takes the form of wooden strips which are arranged in rib fashion and nailed to the wall.

If the wooden strips were to be replaced by tape fasteners that were precoated with adhesive, time and convenience of installation would not be served because the installer would have to wait for the adhesive to set and the lack of rigidity of the tape would present difficulties in alignment and placement. Moreover, if the tape member is adhesively bonded to the wall or other rigid surface, difficulties such as varying values for temperature and humidity peculiar to each installation site impede achieving a uniform and permanent bond.

The spaced points of attachment provided by nails or tacks would not secure the entire surface of a fabric tape fastener to the wall and it has been found that the lack of rigidity of the tape member will not permit it to support wall panels or any other body of moderate weight because the weight of such bodies will rent the tape member at its points of affixation to the wall. However, it was found that when a tape member was provided with sufficient rigidity by bonding it to a plastic strip so that it could be nailed to a wall or other solid surface, wall panels and the like could be supported but that a flush contact could not be maintained with the solid surface because the impingement of the nail through the center of the plastic strip caused the edges of the strip to bow out from the wall. This in turn inhibited a proper mating of the hooking elements because the hooking surface of plastic strip sufficiently deviated from parallelism to prevent engagement of hooks and loops at the center of the strip.

The present invention is based upon the discovery that a tape fastener having a plurality of hooking elements made of synthetic resin material may be used in conjunction with a semi-rigid plastic strip such as a vinyl strip having an arched cross section which produces a slight curvature through its base for the purpose of expeditiously securing objects to rigid surfaces. It was found that a tape member such as is sold under the trademark Velcro (a trademark of Velcro Corporation, 681 5th Ave., New York, N.Y. and as described in U.S. Pat. No. 3,009,235 may be used in combination with a plastic strip such as virgin high impact semi-rigid vinyl having an arched cross section through its narrow dimension to hold material objects to rigid surfaces. If the object to be held in place or instilled is itself a rigid body such as a wall panel it is an object of this invention to also provide said rigid object with a plastic strip backed loop fastener for engagement with the plastic strip backed hook fastener in place on the particular rigid surface. When the object to be held in place is a non-rigid body such as a cushion for attachment to furniture it was found that it was unnecessary to attach a semi-rigid fastener to the non-rigid body and that when a loop tape member alone is attached to the non-rigid body it affords optimum effective engagement with a plastic strip backed hook fastener attached to the rigid surface. It was further found that providing the vinyl strip with a slight curvature across the width of its base would prevent the edges of the strip from bowing outwardly when nails or the like were used to attach the strip to a rigid surface. A curvature of the base of the vinyl strip such that the angle between the longitudinal edge of the strip and a plane drawn to include both longitudinal edges is not less than about 2° will provide a flush contact of the base of the plastic strip with the rigid surface to which it is attached. The arched base of the plastic strip therefore assures that upon physical transfixion to a rigid surface the hooking elements of the tape fastener bonded to the plastic strip will offer a parallel and therefore maximum engaging surface to the hooking elements of the fastener to be mated.

Broadly stated, the new fastening device comprises a semi-rigid plastic strip having an arched cross section and defining in cross section a concave base and a convex surface such that physical attachment of the strip to a flat surface will cause the strip to flatten without bowing at its longitudinal edges and a tape member bonded on its under side to the convex surface of the plastic strip having a plurality of raised hooking elements. More particularly, the invention relates to a semi-rigid vinyl strip as described above having longitudinal ridges extending lengthwise along its edges and forming a channel in which the tape member is fixedly positioned.

The invention also provides a novel method of making this new fastening device. It broadly comprises extruding plastic as a substantially rectangular strip having a concave base and a convex surface, cooling the extruded form, coating the under surface of a tape member with a thermoplastic adhesive, the opposite surface having a plurality of hooking elements extending therefrom, heating the thermoplastic adhesive, combining adhesive coated surface of the tape fastener to the convex surface of the cooled vinyl strip and passing the combined tape member and vinyl strip through complementary concave-convex pressure rolls tailored to the designed extruded form to be contiguous with the entire curved surface thereof whereby the adhesive bond is pressure sealed. Thus, an essential feature of the new method is that the tape fastener element is combined with the vinyl strip in a manner to form a complete bond of tape to strip. One particular technique for effecting this complete bond involves joining the adhesive coated side of the tape member to the vinyl strip while the adhesive is still tacky from heat activation and the configuration of the vinyl strip has set after sufficient cooling.

Preferred embodiments of the invention are described hereinbelow with reference to the accompanying drawings wherein:

FIG. 1 is a fragmentary section of the apparatus for making the new fastening assembly in accordance with the method of the invention;

FIG. 2 is an enlarged fragmentary section taken along the line 2—2 of FIG. 1;

FIG. 3 is an enlarged fragmentary section taken along the line 3—3 of FIG. 1;

FIG. 4 is an enlarged fragmentary section of the new fastening assembly being utilized in the installation of wall to wall carpeting;

FIG. 5 is an enlarged vertical section of the new fastening being utilized in the attachment of material objects to a rigid surface.

Referring to FIGS. 1–3, there is shown a particularly advantageous form of apparatus for practicing the method of this invention. A tape fastener element 10, shown here for purposes of illustration as one having as hooking elements raised threads of synthetic resin material engaging hooks, is advanced from a storage spool (not shown) into a retaining bin 11. The purpose of retaining bin 11 is to hold a sufficient amount of slack tape to allow an operator time to skive and join the end of the tape fastener element of one storage spool to the leading edge of the tape fastener element of another storage spool and thus maintain the continuous nature of the method. It is helpful to this end to provide means for varying the rate of translation of tape fastener element 10 entering and leaving retaining bin 11.

As shown in FIG. 1, tape member 10 moves from retaining bin 11, ascends to roller 12 and enters trough 14 which is disposed below infra-red lamps 15. The under surface of tape member 10 which has been precoated with a thermoplastic adhesive faces and therefore is exposed to the heat of infra-red lamps 15 whose proximity to trough 14 may be adjusted according to the rate of travel of tape member 10 through the trough. The greater the rate of travel, the closer is the placement of infra-red lamps 15 to trough 14 so that a heat activation range of from about 200° to 220° F. may be maintained.

The selection of the adhesive is restricted by the kind of surfaces to be bonded. In the example being described, the base of the tape member is nylon and the extruded strip is vinyl. Thus, an adhesive seal must be effected between a nylon and a vinyl surface. One adhesive which can achieve the desired bond is a synthetic rubber resin, solvent type adhesive, Velcro-40 (trade name of American Velcro, Inc.). This adhesive contains approximately 20–28% by weight solids. The solids are comprised of 40–60% by weight butadiene acrylonitrile copolymer rubber and 60–40% by weight of a vinyl resin which is a copolymer of vinyl chloride and vinyl acetate. The solvent comprised approximately 50–50% mixture of acetone and methylethylketone. The ingredients were blended to form a liquid adhesive. The adhesive is applied to the rear surface of tape member 10 and allowed to set by drying. This adhesive has a low melting point of about 170° F. and provides a bond strength of about 160 pounds.

Vinyl strip 21, preferably a virgin high impact semi-rigid vinyl, is extruded from conventional plastics extruder die 20 into substantially rectangular shape and advanced transversely through twenty feet of cool air from an air blower 22. Cooling the extrusion in an air stream for twenty feet sufficiently cures the vinyl strip 21 by shrinking and hardening so that it acquires rigidity and body to support tape member 10 as it is laminated and bonded to its convex surface. The rigidity acquired in the cooling also prevents the distortion of the newly fabricated fastening device in its passage under roller 16 and through pressure rolls 17 and 18.

As shown in FIGS. 1 and 2, the extruded vinyl strip 21 with tape fastener element 10 laminated thereon enters betwen a pair of opposed complementary pressure rolls 17 and 18 arranged one above the other about respective shafts 23 and 24 which are perpendicular to the line of travel of extruded vinyl strip 21. The pressure rolls 17 and 18 are driven by variable speed means in opposite directions but at an equal rate. The width of the working surface of lower pressure roll 18 is equal to the outer width of vinyl strip 21, but the width of the working surface of pressure roll 17 is approximately equal to the width of the channel formed between the longitudinal ridges 26 so that the area to be pressurized coincides with the area of tape member 10 which is positioned in the channel formed by longitudinal ridges 26. Longitudinal ridges 26 are best seen in the embodiment of FIG. 3 but the area of vinyl strip 21 upon which pressure is exerted as it passes through pressure rolls 17 and 18 may best be seen in the embodiment of FIG. 2.

The surface of upper pressure roll 17 is concave to the same degree as the complementary surface of lower pressure roll 18 is convex and this degree of curvature conforms to the degree of curvature of the arched cross section of the vinyl strip. Thus, when a force perpendicular to shafts 23 is applied in the direction of shaft 24, pressure is transmitted to the contiguous interfaces of pressure rolls 17 and 18 and thence to the superimposed vinyl strip 21 and tape element 10 so that a complete and permanent bond of tape element 10 to vinyl strip 21 is effected.

In the general mode of operation, the tape member 10, precoated with a thermoplastic adhesive is advanced through a slack maintaining retainer bin 11 and pulled to trough 14 where the thermoplastic adhesive is heated to 200–220° F. by infrared lamps 15, at which point the adhesive is fused and softened to a tacky state. At the same time, the vinyl strip 21 is extruded from the opposite direction from plastics extruder 19 and through extrusion die 20 which imparts the slightly arched cross section and longitudinal ridges 26 to the substantially rectangular configuration of vinyl strip 21. The extruded vinyl strip 21 is cooled by air blower 22 for approximately twenty feet prior to tangential engagement by tape member 10 whose path intercepts the path of vinyl strip at roller 26. The bond of tape member 10 to vinyl strip 21 is made permanent by simultaneous passage through concave-convex pressure rolls 18 and 17.

An important feature of this method is that the tangential engagement of tape member 10 to vinyl strip 21 is designed to occur precisely at the point where the extrusion has cooled to a rigidity sufficient to withstand the deforming force of pressure rolls 17 and 18 and the activated thermoplastic adhesive on the base of tape member 10 is tacky. It has been found that laying the adhesive coated tape member onto the hot extruded vinyl as closely as possible to the extrusion die 20 produced a perfect bond when the pressure of pressure rolls 17 and 18 was applied but distortion of the end product also resulted because the vinyl was still warm and lacked sufficient rigidity to withstand the stress of the pressure rolls. The present method permits the permanent continuous in situ bonding of tape member 10 to vinyl strip 21 by providing sufficient cooling from air blower 22 to shrink and harden the vinyl strip 21 and bringing it into tangential engagement with tape member 10 after the thermoplastic adhesive coated on its base has achieved a tacky condition and before passage through concave-convex pressure rolls 18 and 17.

The product of the aforementioned method is shown in FIG. 3. It comprises a semi-rigid vinyl strip 21 having an arched cross section through its narrow dimension and of uniform thickness with longitudinal raised ridges 26 disposed along the edges of its narrow dimension. In FIG. 3 the arched cross section of vinyl strip 21 is shown to be slightly concave exteriorly such as that shown in FIG. 3 an angle $a$ between a plane A—A drawn to include opposite longitudinal marginal edges and the concave surface of the strip is about 2.3°. When the vinyl strip is transfixed through its center to a flat rigid surface, the flattened concavity continues to exert a force which impinges the edges of vinyl strip 21 against the flat rigid surface and consequently offsets the tendency of the edges of vinyl strip 21 to curl outwardly toward the center of the strip.

This tendency to curl towards the center of the vinyl strip especially around the points of transfixion to the flat rigid surface, is further depleted by the longitudinal rigidity afforded by ridges 26.

The tape member 10 which in turn comprises a base sheet of fabric material 28 and a plurality of raised threads of material engaging hooks 29. These hooking elements are best seen in the embodiment of FIG. 3 in which they are shown as material engaging hooks. In the preferred embodiment, the base sheet 28 is made of a woven synthetic resin material such as nylon. The material engaging hooking elements are also preferably made of synthetic resin material which is interwoven with the base sheet 28. Other materials may be substituted for the base sheet and the hooks, as, for example, threads of fine wire; or the hooking elements could be made by some method other than weaving, such as a continuous casting operation.

However, the tape member 10 which is bonded to vinyl strip 21 may also comprise a base sheet of fabric material 10 having a plurality of raised threads of synthetic resin material in the form of material engaging loops 30 which are adapted to engage the hooks 29 of the first tape fastener element. The loops are best seen in the embodiment of FIG. 5 in which they are shown as part of fastening assembly member 33 which is attached to flat rigid surface 34 and which is adapted to be engaged by fastening device members 35 and 36 which are respectively attached to separate panels 31 and 32.

Attachment of the fastening device members 35 and 36 having hooks 29 to fastening assembly member 33 having loops 30 is quick and sure. The width of fastening device members vary and for purposes of illustration, in FIG. 5, fastening device member 33 is three times wider than fastening device members 35 and 36 to show one variation in which two panels may be quickly secured in alignment to a rigid surface. Only light pressure contact is required between the material engaging hooks 29 and the loops 30 to effect their attachment. In this manner, a number of material engaging hooks 29 engage a number of loops 30. Although the exact number of engagements is indeterminate, it has been found that the attachment thus made is secure and strong, particularly against the shearing action of the weight of panels 31 and 32 with respect to rigid surface 34.

FIG. 4 shows an embodiment of the present invention wherein tape member 10 having loops 30 interwoven therein is not bonded to a vinyl strip in the manner of the usual fastening device member but is rather sewn along the edges of the under surface of carpet 37. Thus, FIG. 4 illustrates that the present invention is also useful in attaching non-rigid bodies such as carpets or convertible automobile covers to rigid surfaces by means of a tape member 10 attached to the flexible body and a fastening device member, denoted as 38 in FIG. 4, attached to the rigid surface.

The embodiment of the fastening device shown in FIG. 4 for use in securing wall to wall carpeting 37 in place may be separated by peeling the carpet 37 away from the fastening device member 38. The ease of separation feature of the present invention will be more fully appreciated in connection with other non-rigid bodies such as furniture cushions and convertible top covers in automobiles. The separation of the parts is permitted by reason of the resilient nature of the material engaging hooks 29. As the peeling takes place, the hooks 29 bend and open, permitting the loops 30 to disengage without breaking or being torn away from the base fabric 10.

With respect to the particular embodiment of the present invention shown in FIG. 5, separation by peeling will be precluded because both hook and loop tape fastener assembly members are, in addition to being themselves semi-rigid, attached to rigid surfaces. However, separation may nevertheless be effected as deftly as in the case when one tape member is attached to a non-rigid body because the introduction of a letter-opener-type device will perform the same work of bending and opening the resilient hooks 29 as peeling the flexible tape member 10.

It can be seen that a fastening device made in accordance with the present invention overcomes the major disadvantages of the prior art devices. Rigid objects to be secured can be installed without defacing or damaging them with nails, staples or screws. Flexible objects to be secured can be installed quickly and with little skill. Both types of objects can be removed easily, one by simple peeling action, the other just as simply with the aid of a letter-opener-type device. Its applications are legion. There is great flexibility in the placement of the objects being installed.

Although it is preferred that the tape member having the material engaging loops be attached to the non-rigid bodies to be installed, the tape member having material engaging hooks may be substituted without going beyond the parameters of the invention. The same principle of engagement between the material engaging hooks and loops holds true.

I claim:
1. A continuous method of producing a fastening device having hooking elements formed of a flexible resilient material into one of hooks and loops characterized by the property that pressing a surface defined by the hooks into face-to-face relationship with a surface defined by the loops will result in a large number of hooks engaging a large number of loops which resist separation parallel to the interfacial plane of engagement but are readily separable by peeling forces applied substantially normal to this interfacial plane for use in installing objects to rigid surfaces which comprises:
 (a) extruding a substantially rectangular plastic strip having a concave base and a convex surface,
 (b) cooling the extruded form,
 (c) coating the under surface of a tape member with a thermoplastic adhesive, the opposite surface having a plurality of one of said hooking elements,
 (d) heating the thermoplastic adhesive,

(e) combining the adhesive coated surface of the tape member to the convex surface of the cooled vinyl strip, and (f) passing the adhered tape member and vinyl strip through complementary concave-convex pressure rolls tailored to the designed extruded form to be contiguous with the entire curved surface thereof whereby the adhesive bond is pressure sealed on the entire curved upper surface of the vinyl strip.

2. A method of producing a fastening assembly adapted for affixing material objects to rigid surfaces according to claim 1 wherein the heating step is accomplished by a bank of infra-red lamps.

3. A method as recited in claim 2 wherein the strip is extruded with longitudinal ridges along the edges of the vinyl strip.

4. A method as recited in claim 1 wherein the coating step is performed prior to the storage of the tape member on spools.

5. A method as recited in claim 4 wherein the continuous nature of the process is maintained by skiving and joining the end of the tape fastener on one spool with the end of the tape fastener on the next spool and feeding sufficient footage of slack tape into a retaining bin to permit completion of the skiving and joining operations.

6. A method according to claim 1 comprising first shrinking and hardening the plastic strip and then bringing it into tangential engagement with the tape member having its adhesive in a tacky condition and before passage through the pressure rolls.

References Cited
UNITED STATES PATENTS 2,386,821   10/1945   Tardiff _____ 156—214

BENJAMIN R. PADGETT, Primary Examiner

S. J. LECHERT, Jr., Assistant Examiner

U.S. Cl. X.R.

156—84, 228, 244, 272